United States Patent
Hammer et al.

(10) Patent No.: US 9,914,485 B2
(45) Date of Patent: Mar. 13, 2018

(54) VEHICLE HOOD ASSEMBLIES INCLUDING A HOOD REINFORCEMENT STRAP WITH LOBE STRUCTURES AND VEHICLES INCLUDING THE SAME

(71) Applicant: Toyota Motor Engineering & Manufacturing North America, Inc., Erlanger, KY (US)

(72) Inventors: Jeremiah T. Hammer, Ann Arbor, MI (US); Aaron R. Steinhilb, Milan, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 37 days.

(21) Appl. No.: 15/065,130

(22) Filed: Mar. 9, 2016

(65) Prior Publication Data
US 2017/0259855 A1 Sep. 14, 2017

(51) Int. Cl.
*B62D 25/12* (2006.01)
*B62D 25/08* (2006.01)

(52) U.S. Cl.
CPC .......... *B62D 25/12* (2013.01); *B62D 25/082* (2013.01)

(58) Field of Classification Search
CPC .............................. B62D 25/12; B62D 25/082
USPC ........................... 296/187.04, 193.11, 187.09
See application file for complete search history.

(56) References Cited

U.S. PATENT DOCUMENTS

| | | | |
|---|---|---|---|
| 7,163,242 B2 * | 1/2007 | Shuler ..................... | B60R 19/18 293/120 |
| 7,810,877 B2 * | 10/2010 | Ishitobi ................... | B60R 21/34 180/69.2 |
| 8,007,036 B2 | 8/2011 | Fukumoto et al. | |
| 8,052,198 B2 | 11/2011 | Seksaria et al. | |
| 8,356,857 B2 * | 1/2013 | Ralston ................... | B60R 21/34 296/187.04 |
| 8,485,588 B1 * | 7/2013 | Voss ..................... | B62D 25/105 180/69.2 |
| 8,991,902 B2 * | 3/2015 | Wisniewski ......... | B62D 25/105 296/187.04 |
| 2002/0070584 A1 * | 6/2002 | Carroll, III ............... | B32B 3/28 296/187.03 |
| 2006/0220418 A1 * | 10/2006 | Behr ....................... | B60R 21/34 296/187.04 |
| 2008/0088154 A1 * | 4/2008 | Rocheblave ............ | B60R 21/34 296/187.04 |
| 2008/0185871 A1 * | 8/2008 | Ishiyama ................ | B60R 21/34 296/187.04 |
| 2009/0026807 A1 * | 1/2009 | Wang ..................... | B60R 21/34 296/193.11 |
| 2009/0195020 A1 * | 8/2009 | Wang ................... | B62D 25/105 296/187.09 |
| 2010/0045070 A1 * | 2/2010 | Rocheblave ............ | B60R 21/34 296/187.04 |

(Continued)

*Primary Examiner* — Jason S Morrow
(74) *Attorney, Agent, or Firm* — Dinsmore & Shohl LLP (57) ABSTRACT

A vehicle hood assembly includes an outer hood panel and an inner hood panel coupled to and positioned below the outer hood panel in a vehicle vertical direction. A hood reinforcement strap is coupled to at least one of the outer hood panel and the inner hood panel. The hood reinforcement strap includes a strap base and lobe structures spaced-apart along a length of the strap base that extend outward from the strap base in the vehicle vertical direction.

18 Claims, 7 Drawing Sheets

(56) References Cited

U.S. PATENT DOCUMENTS

2014/0110971 A1 4/2014 Ray et al.
2015/0054305 A1 2/2015 Steinhilb et al.

* cited by examiner

VEHICLE HOOD ASSEMBLIES INCLUDING A HOOD REINFORCEMENT STRAP WITH LOBE STRUCTURES AND VEHICLES INCLUDING THE SAME

TECHNICAL FIELD

The present specification relates to vehicle hood assemblies, and in particular, to vehicle hood assemblies including a hood reinforcement strap with lobe structures.

BACKGROUND

Vehicles typically include a vehicle hood assembly positioned at a front of the vehicle that selectively covers an engine compartment of the vehicle. The vehicle hood assembly may include one or more panels which may be shaped to reduce the weight of the vehicle hood assembly and/or to accommodate customer styling demands.

During an impact event, such as an impact with a headform at the front of the vehicle, the headform may impact the vehicle hood. In such impact configurations, it is desirable to selectively deform the vehicle hood to absorb energy associated with the impact event. Accordingly, a need exists for vehicle hood assemblies that may selectively deform during an impact.

SUMMARY

In one embodiment, a vehicle hood assembly includes an outer hood panel and an inner hood panel coupled to and positioned below the outer hood panel in a vehicle vertical direction. A hood reinforcement strap is coupled to at least one of the outer hood panel and the inner hood panel. The hood reinforcement strap includes a strap base and lobe structures spaced-apart along a length of the strap base that extend outward from the strap base in the vehicle vertical direction.

In another embodiment, a vehicle includes an engine bay and a drive unit positioned in the engine bay. A vehicle hood assembly is selectively positioned over the engine bay. The vehicle hood assembly includes an outer hood panel and an inner hood panel positioned below the outer hood panel in a vehicle vertical direction. A hood reinforcement strap is coupled to at least one of the inner hood panel and the outer hood panel. The hood reinforcement strap includes a strap base and lobe structures spaced-apart along a length of the strap base that extend outward from the strap base in the vehicle vertical direction.

In yet another embodiment, a hood reinforcement strap that couples to an inner hood panel of a vehicle hood assembly includes a strap base being a substantially planar member and lobe structures that are spaced-apart along a length of the strap base and that extend outward from the strap base to an outer end that opposes the strap base.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are generally directed to vehicle hood assemblies that include a hood reinforcement strap connected to an inner hood panel of the vehicle hood assemblies. The hood reinforcement strap may include a strap base that is used to connect the hood reinforcement strap to the inner hood panel and one or more lobe structures that extend outwardly, away from the strap base and toward an engine of the vehicle with the hood assemblies in a closed position. The lobe structures can be sized and located to engage an engine component with deformation of the vehicle hood assemblies toward the engine. The hood reinforcement strap may be located generally in a center of the vehicle hood assemblies to add a reinforcement that can increase reactionary forces on the hood inner panel during a hood impact event, as will be described in greater detail below.

As used herein, the term "vehicle longitudinal direction" refers to the lengthwise direction of components of the vehicle (i.e., in the +/−X-direction as depicted). The term "vehicle lateral direction" refers to the cross-component direction (i.e., in the +/−Y-direction as depicted), and is transverse to the longitudinal direction. The term "vehicle vertical direction" refers to the upward-downward direction of the vehicle (i.e., in the +/−Z-direction as depicted).

Figure 1:
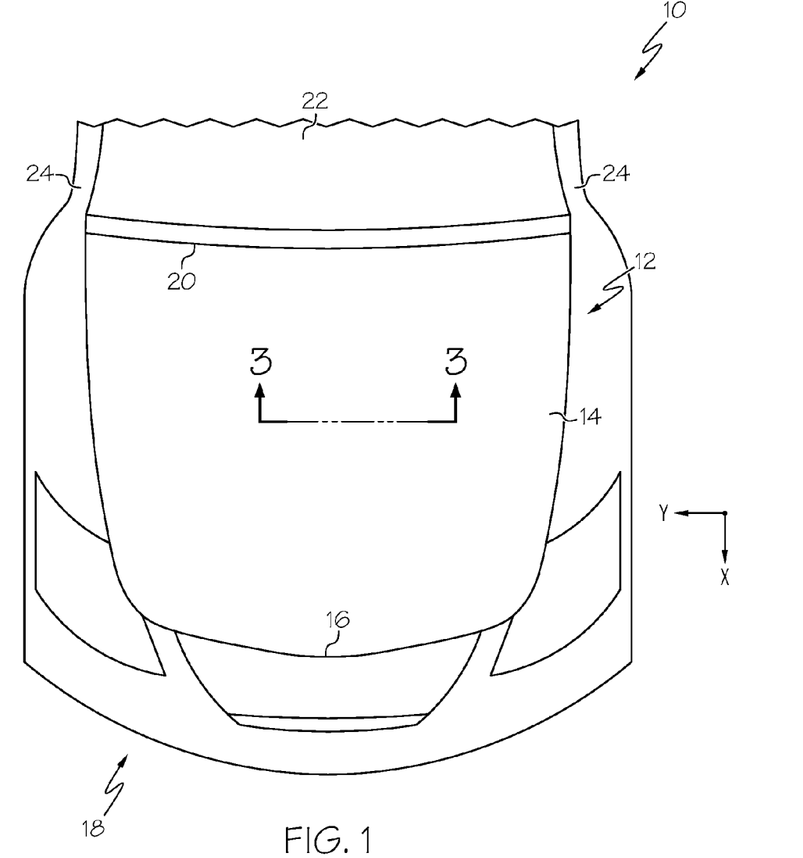
FIG. 1 schematically depicts a partial view of a vehicle including a vehicle hood assembly according to one or more embodiments shown and described herein.

Referring to FIG. 1, a vehicle 10 includes a vehicle hood assembly 12 that includes an outer hood panel 14. The outer hood panel 14 extends in both the vehicle longitudinal and vehicle lateral directions so as to cover an engine compartment of the vehicle 10. The vehicle hood assembly 12 is generally bounded at a front 16 by a front bumper assembly 18, at a rear 20 by a front windshield 22 and A-pillar assemblies 24 on both passenger and driver sides of the vehicle 10. If the vehicle 10 does not have an engine located in a front engine compartment beneath the vehicle hood assembly 12, the vehicle hood assembly 12 may still generally be located in the same position, but may overlie a storage compartment or other vehicle feature.

The vehicle hood assembly 12 may include various styling details viewable from outside the vehicle 10. For example, the outer hood panel 14 may include any number of height changes, for example, depending on the maker of the vehicle 10. In other embodiments, the outer hood panel 14 may include minimal such styling details.

Figure 2:
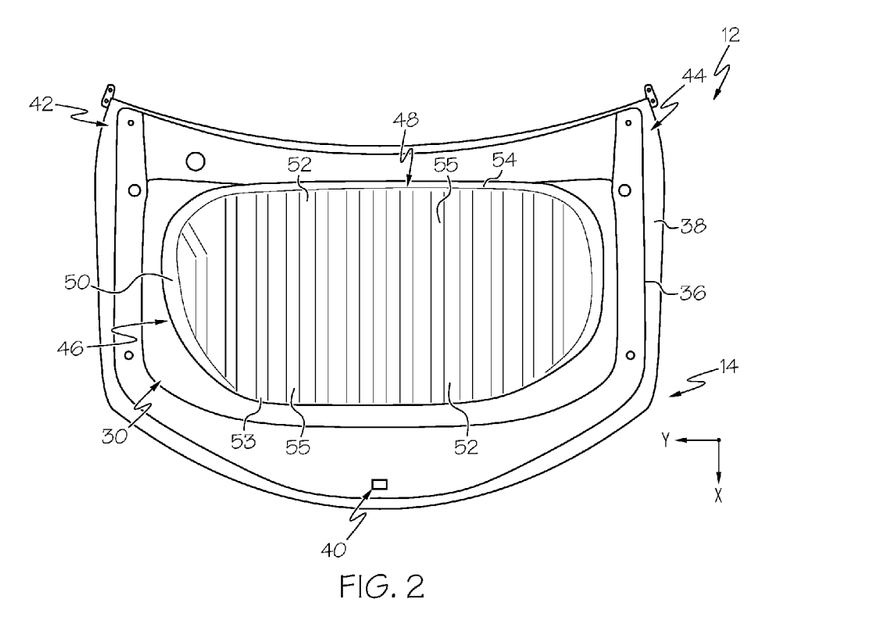
FIG. 2 schematically illustrates a bottom view of the vehicle hood assembly of FIG. 1 according to one or more embodiments shown and described herein.

Referring to FIG. 2, the vehicle hood assembly 12 is illustrated in isolation and includes the outer hood panel 14 and an inner hood panel 30 that is connected to the outer hood panel 14 at an inner side 32 (FIG. 3) of the outer hood panel 14. The inner hood panel 30 may be coextensive with the outer hood panel 14 and may be attached to the outer hood panel 14 about its perimeter 36. This attachment may be made by any suitable method, such as by folding a perimeter 38 of the outer hood panel 14 over the perimeter 36 of the inner hood panel 30 and welding, applying adhesive, etc. The inner hood panel 30 and the outer hood panel 14 may be formed of any suitable materials or combination of materials such as metals, (e.g., press formed aluminum alloy sheets). To secure the vehicle hood assembly 12 to the vehicle 10, the vehicle hood assembly 12 may include a front latch component 40 and hinge mounting locations 42 and 44.

Inboard of the perimeter 36, the inner hood panel 30 includes a central portion 46 that extends over a substantial portion of the length and width of the inner hood panel 30. The central portion 46 may be formed as a recess 48 having a peripheral wall 50 extending therearound. The central portion 46 includes a number of ribs 52 that extend generally in the vehicle longitudinal direction, between opposite sides 53 and 54 of the peripheral wall 50 and are aligned with one another forming a row of the ribs 52 with valleys 55 between the ribs 52 forming an undulating pattern extending in the vehicle transverse direction. While the ribs 52 are illustrated rounded in profile and extending downwardly toward the engine components 58 (FIG. 3) with the vehicle hood assembly 12 in the closed configuration, the valleys 55 may extend upwardly in the opposite direction toward the outer hood panel 14, terminating with a relatively flat profile. Instead of a single row of the ribs 52 as shown, there may be multiple rows of longitudinally discontinuous ribs 52.

Figure 3:
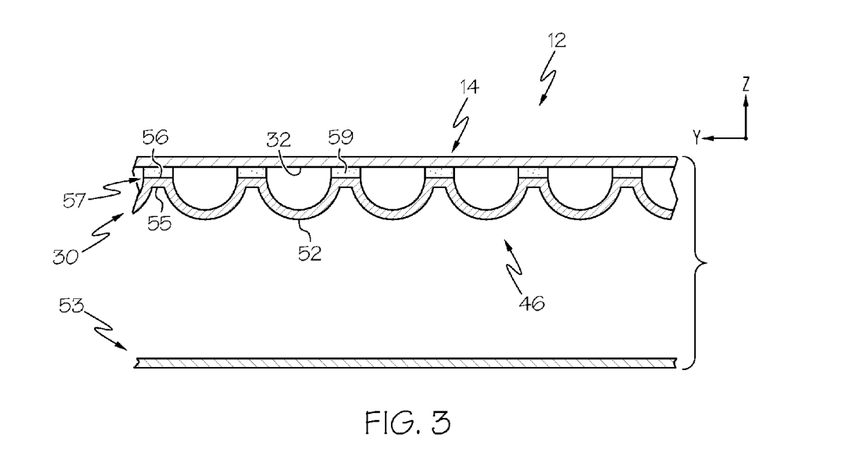
FIG. 3 schematically illustrates a section view of the vehicle hood assembly of FIG. 2 along lines 3-3 of FIG. 1 according to one or more embodiments shown and described herein.

Referring to FIG. 3, plural valleys 55 serve as protrusion portions formed in the central portion 46 of the inner hood panel 30. Each of the valleys 55 is, as viewed in a cross-section along an orthogonal plane to the vehicle longitudinal direction, formed with a protruding profile where the inner hood panel 30 in the central portion 46 is raised toward the outer hood panel 14 to provide a top portion 56 and gaps 57 between the inner hood panel 30 and the outer hood panel 14. Each profiled flattened valley 55 is disposed substantially parallel to the outer hood panel 14. An adhesive, such as mastic may be used to join the valleys 55 to the outer hood panel 14 at the top portions 56 of the valleys 55.

Figure 4:
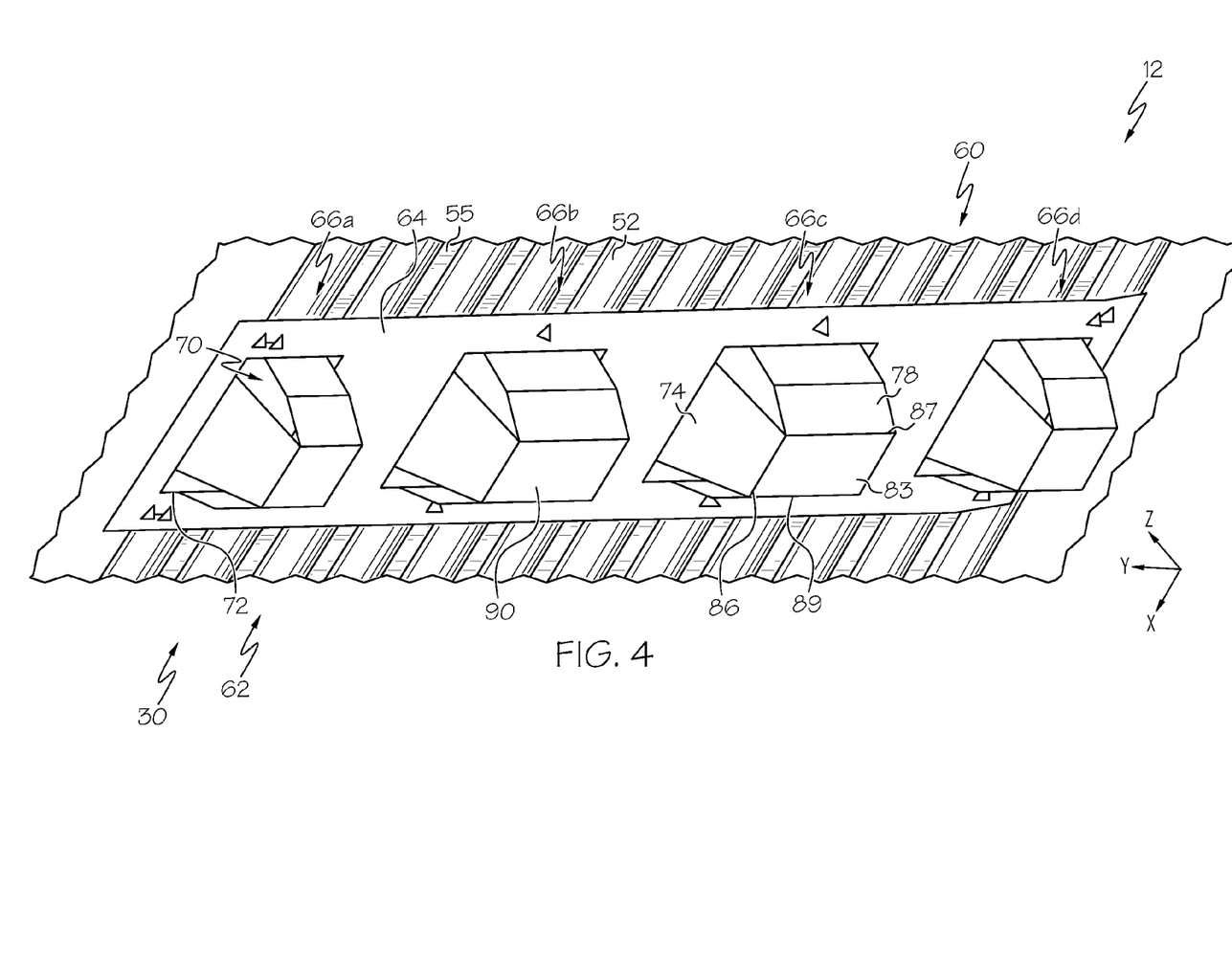
FIG. 4 schematically illustrates a partial, bottom view of the hood assembly of FIG. 2 including a hood reinforcement strap according to one or more embodiments shown and described herein.

While FIGS. 2 and 3 illustrate the vehicle hood assembly 12 in isolation, FIG. 4 illustrates the vehicle hood assembly 12 with a hood reinforcement strap 60 connected to an inner side 62 of the inner hood panel 30. Without wishing to be bound by theory, head impact tests to the hood areas of vehicles illustrate a need for providing relatively soft impacts (or controlled headform deceleration), particularly before the vehicle hood assembly 12 reaches relatively rigid engine components. The use of the hood reinforcement strap 60 can deform in a controlled, predictable manner that provides for controlled headform deceleration.

Referring still to FIG. 4, the hood reinforcement strap 60 includes a strap base 64 and a plurality of lobe structures 66 that extend outwardly from the strap base 64, away from the inner hood panel 30 and toward the engine components 58 (FIG. 3) with the vehicle hood assembly 12 in the closed configuration. The strap base 64 may be a substantially planar member that spans across multiple ones of adjacent ribs 52, tying the ribs 52 together by being connected individually to each or at least some of the ribs 52 (e.g., through welding, adhesive, fastening, etc.), as the ribs 52 may be each of substantially the same height. Tying multiple ones of the ribs 52 together using the strap base 64 can provide for increased reactionary forces from the inner hood panel 30 to a headform during an impact to the central portion of the vehicle hood assembly 12 by increasing involvement of the adjacent ribs 52 (and valleys 55) that are tied together.

The hood reinforcement strap 60 further includes the plurality of lobe structures 66 that extend inwardly into the engine compartment and toward the engine components. In the illustrated embodiment, the lobe structures 66 are discrete structures that are spaced-apart from each other along a length of the hood reinforcement strap 60. In the illustrated embodiment, four lobe structures 66a-66d are provided with lobe structures 66a and 66d being outboard lobe structures 66a and 66d and lobe structures 66b and 66c being inboard lobe structures 66b and 66c. In some embodiments, the outboard lobe structures 66a and 66d may be of substantially the same dimensions and the inboard lobe structures 66b and 66c may be of the same dimensions, but having a different dimension than the outbound lobe structures 66a and 66d. In the illustrated example, the outboard lobe structures 66a and 66d may have a width in the vehicle lateral direction that is less than a width of the inboard lobe structures 66b and 66c. In other embodiments, the widths and other dimensions of all the lobe structures 66 may be the same or all be different. The dimensions and number of the lobe structures 66 may depend, for example, on the geometries of the engine compartment and engine components.

The lobe structures 66 may at least partially be formed of material forming the strap base 64. In other embodiments, the lobe structures 66 may be formed separately from the strap base 64 (of the same or different material) and then connected thereto. Any suitable material may be used in forming the hood reinforcement strap 60, such as metals, plastics, foams, etc. The hood reinforcement strap 60 may be formed using any suitable method, such as molding and/or machining. In some embodiments, the strap base 64 may include openings 70 having perimeters 72 out of which the lobe structures 66 extend. In the illustrated embodiment, the openings 70 are rectangular with somewhat rectangular lobe structures 66; however, other shapes may be provided.

Figure 5:
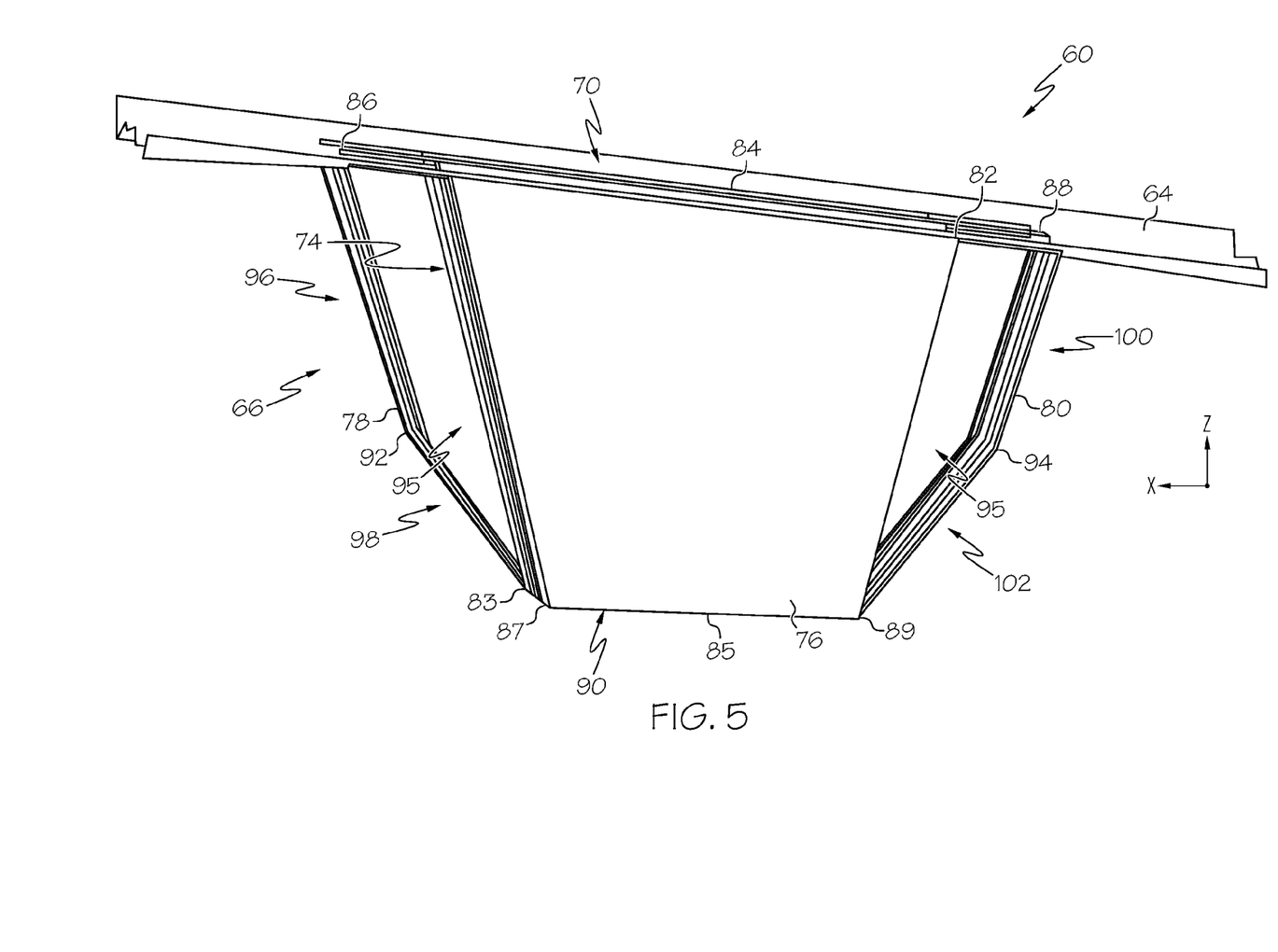
FIG. 5 schematically illustrates a side view of the hood reinforcement strap of FIG. 4 in isolation according to one or more embodiments shown and described herein.

FIG. 5 illustrates the hood reinforcement strap 60 in isolation including the strap base 64 and the lobe structure 66. The lobe structure 66 includes laterally facing legs 74 and 76 and longitudinally facing legs 78 and 80. The laterally facing leg 76 may extend outwardly from side 82 of the opening 70 and the laterally facing leg 74 may extend outwardly from an opposite side 84 of the opening 70 (FIG. 4). The longitudinally facing leg 78 may extend outwardly from side 86 of the opening 70 and longitudinally facing leg 80 may extend outwardly from an opposite side 88 of the opening 70. An outer end 90 extends between connects the laterally facing legs 74 and 76 and the longitudinally facing legs 78 and 80 and opposes the opening 70. The laterally facing legs 74 and 76 are connected to laterally facing edges 83 and 85 of the outer end 90 and the longitudinally facing legs 78 and 80 are connected to longitudinally facing edges 87 and 89 of the outer end 90. In some embodiments, the outer end 90 may have a footprint that is less than the opening 70, causing the lobe structures 66 to be somewhat truncated pyramid-shaped.

The laterally facing legs 74, 76 and/or the longitudinally facing legs 78, 80 may include one or more buckling control features. For example, the longitudinally facing legs 78 and 80 are illustrated as including bends 92 and 94. The bend 92 of the longitudinally facing leg 78 divides the longitudinally facing leg 78 into a base portion 96 and an end portion 98. Likewise, the bend 94 of the longitudinally facing leg 80 divides the longitudinally facing leg 80 into a base portion 100 and an end portion 102. The bends 92 and 94 can provide lines of weakness that facilitate buckling at their locations. In some embodiments, the laterally facing legs 74 and 76 may include bends or other buckling control features, or the laterally facing legs 74 and 76 may be straight and not include buckling control features, as shown. In addition to the beads 92 and 94 as buckling control features, adjacent laterally facing and longitudinally facing legs 74, 76 and 78, 80 may not be directly connected to each other along at least portions of their lengths providing gaps 95 therebetween, which can further aid in tuning lobe buckling.

Figure 6:
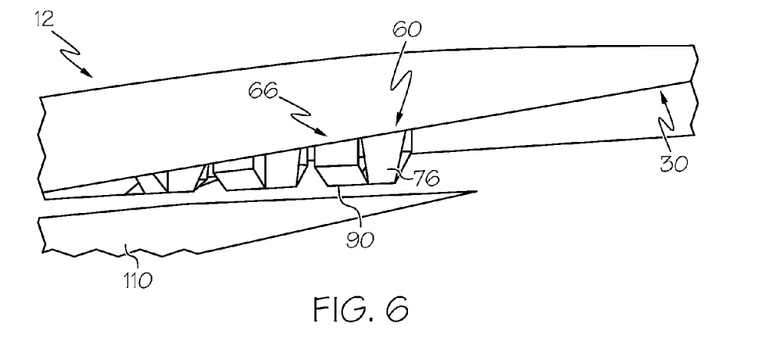
FIG. 6 schematically illustrates the vehicle hood assembly of FIG. 4 including the reinforcement strap in operation according to one or more embodiments shown and described herein.
Figure 7:
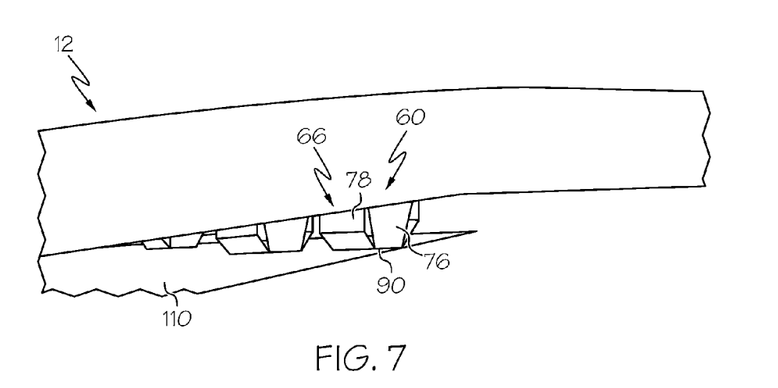
FIG. 7 schematically illustrates the vehicle hood assembly of FIG. 6 including the reinforcement strap in engagement with an engine component under a hood impact force according to one or more embodiments shown and described herein.
Figure 8:
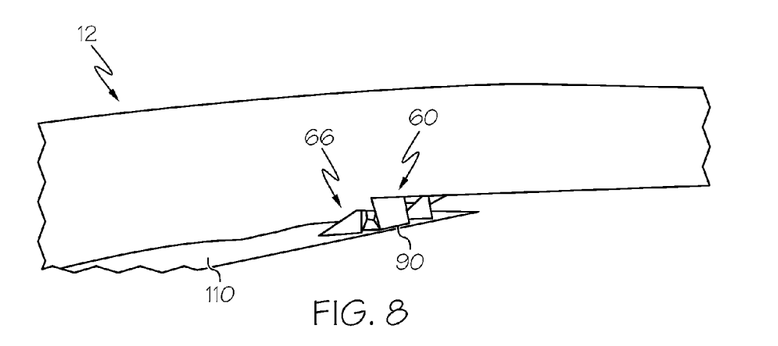
FIG. 8 schematically illustrates the vehicle hood assembly of FIG. 6 including the reinforcement strap in engagement with an engine component under a hood impact force according to one or more embodiments shown and described herein.

Referring to FIGS. 6-8 operation of the hood reinforcement strap 60 is illustrated. Referring first to FIG. 6, the hood reinforcement strap 60 is connected to the inner hood panel 30 as described above. Under normal operating conditions with the vehicle hood assembly 12 in the closed configuration, as shown, the lobe structures 66 are spaced from the engine components in the vehicle vertical direction, such as an engine cover 110 (representing the engine or other power unit). Upon application of a downward force sufficient impact from, for example, a headform, the vehicle hood assembly 12 deforms toward the engine cover 110, bringing the outer ends 90 of the lobe structures 66 into contact with the engine cover 110 and the laterally facing legs 74, 76 and the longitudinally facing legs 78 and 80 begin to buckle and the lobe structures 66 aid in absorbing impact energy, as illustrated by FIG. 7. Referring to FIG. 8, the inner hood panel 30 contacts the engine cover 110, which restricts further downward deformation of the vehicle hood assembly 12.

Figure 9:
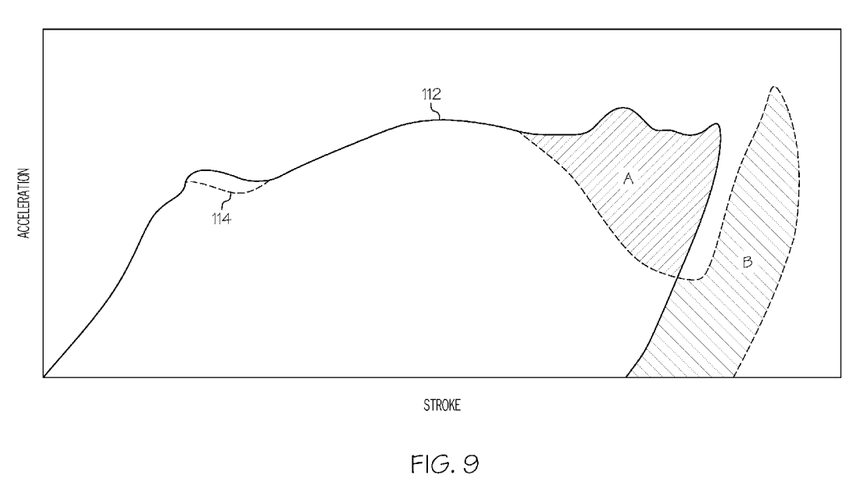
FIG. 9 illustrates an exemplary graph of acceleration versus stroke for a vehicle hood assembly including the hood reinforcement strap of FIG. 4 compared to a vehicle hood assembly without the hood reinforcement strap according to one or more embodiments shown and described herein.

Referring to FIG. 9, a graph of acceleration versus stroke is shown for a vehicle hood assembly including the hood reinforcement strap (solid line 112) compared to a vehicle hood assembly without the hood reinforcement strap (dashed line 114). The graph of FIG. 9 may be generated using data collected from any suitable testing procedure, such as Japan New Car Assessment Program (JNCAP), Euro NCAP or Global Technical Regulation (GTR) No. 9 testing procedures for pedestrians. As can be seen by line 112, an additional amount of energy absorption is provided at area A prior to hood inner panel contact with the engine components. Increasing the amount of energy absorbed prior to contact with the engine components using the hood reinforcement strap can reduce the vehicle hood assembly and engine cover from being a primary source of impact energy absorption. As can be seen by area B, stiff structures, such as engine components can provide relatively sharp spikes in headform acceleration.

Figure 10:
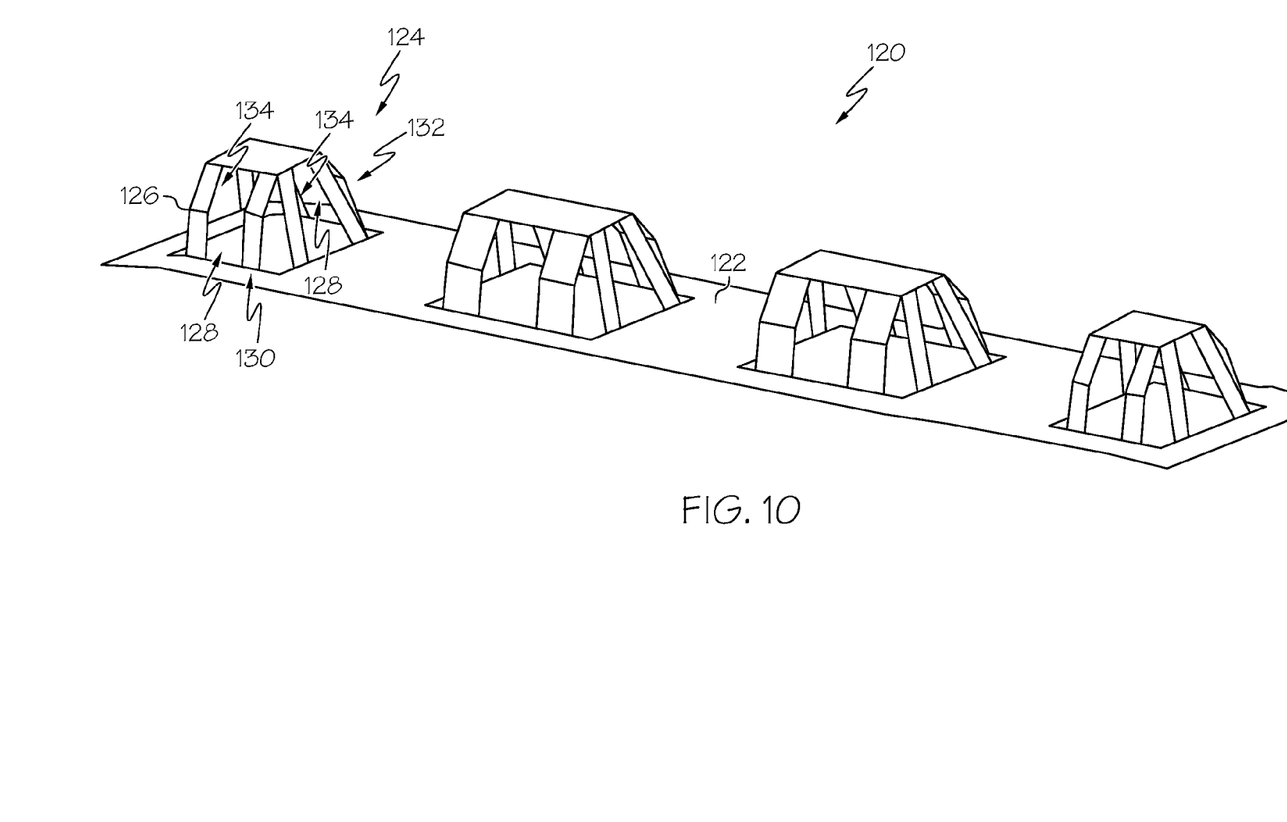
FIG. 10 schematically illustrates a perspective view of another embodiment of a hood reinforcement strap for use with the vehicle hood assembly of FIG. 2 and the vehicle of FIG. 1 according to one or more embodiments shown and described herein.

Referring to FIG. 10, another embodiment of a hood reinforcement strap 120 is shown that includes a strap base 122 and lobe structures 124 extending outwardly from the strap base 122. In addition to bends 126 as buckling control features, the lobe structures 124 further include openings 128 that extend through the longitudinally facing legs 130 and 132 and openings 134 that extend through the laterally facing legs 136 and 138. While the openings 128 and 134 are illustrated as extending the entire height of the legs, 130, 132, 136 and 138, the openings 128 and/or 134 may extend only a portion of the height of the legs 130, 132, 136 and 138. Multiple openings may also be provided in a single leg 130, 132, 136 and 138. Additionally, any openings in the legs 130, 132, 136 and 138 may intersect the bends 126. Multiple bends may also be provided in a single leg 130, 132, 136 and 138.

The hood reinforcement strap may be coupled to the inner hood panel by any suitable method, including, but not limited to, welding, brazing, connection with mechanical fasteners (e.g., clips, bolts etc.), and/or connection with structural adhesives. While the hood reinforcement straps are described as being connected to the inner side of the inner hood panel, the hood reinforcement straps may be connected to an outer side of the inner hood panel (i.e., located between the inner hood panel and outer hood panel) or attached to an inner side of the outer hood panel. In some embodiments, the lobe structures of the hood reinforcement straps may be filled with a deformable material, such as foam to further tune buckling of the lobe structures.

The above-described hood reinforcement straps provide a reinforcement structure that can be attached to the inner hood panel to provide increased energy absorption following vehicle hood assembly bucking toward engine components. The hood reinforcement straps not only provide for increased energy absorption, but also increased energy absorption with decreased stroke without seeing a spike in acceleration of a headform upon hood inner panel contact with the engine components.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle hood assembly comprising:
an outer hood panel;

an inner hood panel coupled to and positioned below the outer hood panel in a vehicle vertical direction; and a hood reinforcement strap coupled to at least one of the outer hood panel and the inner hood panel, the hood reinforcement strap comprising a strap base and lobe structures spaced-apart along a length of the strap base that extend outward from the strap base in the vehicle vertical direction;

wherein the inner hood panel comprises a plurality of ribs that extend generally in a vehicle longitudinal direction within a central portion of the inner hood panel and the strap base is connected to the plurality of ribs.

2. The vehicle hood assembly of claim 1, wherein the hood reinforcement strap is coupled to an inner side of the inner hood panel.

3. The vehicle hood assembly of claim 1, wherein the strap base spans multiple ribs of the plurality of ribs.

4. The vehicle hood assembly of claim 1, wherein the strap base is substantially planar.

5. The vehicle hood assembly of claim 1, wherein the lobe structure comprises an outer end;

a first laterally facing leg located at a first laterally facing edge of the outer end; and a second laterally facing leg located at a second, opposite laterally facing edge of the outer end.

6. The vehicle hood assembly of claim 5, wherein the first and second laterally facing legs each include a bend that divides the respective first and second laterally facing legs into an end portion and a base portion.

7. The vehicle hood assembly of claim 1, wherein the lobe structure comprises an outer end;

a first longitudinally facing leg located at a first longitudinally facing edge of the outer end; and a second longitudinally facing leg located at a second, opposite longitudinally facing edge of the outer end.

8. The vehicle hood assembly of claim 1, wherein the lobe structure is formed of material forming the strap base.

9. A vehicle comprising:

an engine bay;

a drive unit positioned in the engine bay;

a vehicle hood assembly selectively positioned over the engine bay, the vehicle hood assembly comprising an outer hood panel and an inner hood panel positioned below the outer hood panel in a vehicle vertical direction; and a hood reinforcement strap coupled to at least one of the inner hood panel and the outer hood panel, the hood reinforcement strap comprising a strap base and lobe structures spaced-apart along a length of the strap base that extend outward from the strap base in the vehicle vertical direction;

wherein the inner hood panel comprises a plurality of ribs that extend generally in a vehicle longitudinal direction within a central portion of the inner hood panel and the strap base is connected to the plurality of ribs.

10. The vehicle of claim 9, wherein the reinforcement strap is coupled to an inner side of the inner hood panel.

11. The vehicle hood assembly of claim 9, wherein the strap base spans multiple ribs of the plurality of ribs.

12. The vehicle of claim 9, wherein the strap base is substantially planar.

13. The vehicle of claim 9, wherein the lobe structure comprises an outer end;

a first laterally facing leg located at a first laterally facing edge of the outer end; and a second laterally facing leg located at a second, opposite laterally facing edge of the outer end.

14. The vehicle of claim 13, wherein the first and second laterally facing legs each include a bend that divides the respective first and second laterally facing legs into an end portion and a base portion.

15. The vehicle of claim 9, wherein the lobe structure comprises an outer end;

a first longitudinally facing leg located at a first longitudinally facing edge of the outer end; and a second longitudinally facing leg located at a second, opposite longitudinally facing edge of the outer end.

16. A hood reinforcement strap that couples to an inner hood panel of a vehicle hood assembly, the hood reinforcement strap comprising:

a strap base being a substantially planar member; and lobe structures that are spaced-apart along a length of the strap base and that extend outward from the strap base to an outer end that opposes the strap base;

a first leg located at a first edge of the outer end;

a second leg located at a second edge of the outer end that is opposite the first edge;

a third leg located at a third edge of the outer end that is perpendicular to and extends between the first edge and the second edge; and a fourth leg located at a fourth edge of the outer end that is perpendicular to and extends between the first edge and the second edge.

17. The hood reinforcement strap of claim 16, wherein adjacent ones of the first leg, the second leg, the third leg and the fourth leg are separated by a gap.

18. The hood reinforcement strap of claim 17, wherein the first and second legs each include a bend that divides the respective first and second legs into an end portion and a base portion.

* * * * *